US 6,619,556 B1

(12) United States Patent
Snider et al.

(10) Patent No.: US 6,619,556 B1
(45) Date of Patent: Sep. 16, 2003

(54) INTEGRATED SWITCH PAD AND SENSOR HOLDER/THERMAL ISOLATOR

(75) Inventors: Chris R. Snider, Kokomo, IN (US); Darcy M. Wallace, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/197,112

(22) Filed: Jul. 17, 2002

(51) Int. Cl.[7] .............................. F24F 7/00; H05K 7/20
(52) U.S. Cl. ................. 236/49.3; 361/695; 236/DIG. 19
(58) Field of Search ............................ 236/49.3, 49.1, 236/94, DIG. 19; 361/695, 688, 689, 690, 694; 374/142; 250/342

(56) References Cited

U.S. PATENT DOCUMENTS

| | | | | |
|---|---|---|---|---|
| 4,824,013 A | * | 4/1989 | Gouldey | .................. 236/78 R |
| 5,008,775 A | * | 4/1991 | Schindler et al. | ........... 361/383 |
| 5,364,025 A | * | 11/1994 | Terry | .......................... 236/49.1 |
| 5,731,953 A | * | 3/1998 | Sakurai | ....................... 361/695 |
| 5,772,326 A | * | 6/1998 | Batko et al. | ................. 374/142 |
| 6,082,894 A | * | 7/2000 | Batko et al. | ................. 374/142 |
| 6,102,296 A | | 8/2000 | Snider | ....................... 236/49.3 |

* cited by examiner

Primary Examiner—Marc Norman
(74) Attorney, Agent, or Firm—Stefan V. Chmielewski

(57) ABSTRACT

An automotive climate control for a motor vehicle includes a printed circuit board (PCB), a flexible conductive switch pad and a temperature sensor. The flexible conductive switch pad includes a structure that is formed in conjunction with the flexible conductive switch pad. A switch dome of the flexible conductive switch pad is shaped to make electrical contact with switch contacts formed on the PCB responsive to activation of the switch dome. A portion of the structure includes a thermally conductive elastomer and the temperature sensor is positioned within the structure and electrically coupled to sensor contacts on the PCB.

31 Claims, 5 Drawing Sheets

PRIOR ART

INTEGRATED SWITCH PAD AND SENSOR HOLDER/THERMAL ISOLATOR

TECHNICAL FIELD

The present invention is generally directed to a control for a motor vehicle and, more specifically, to an automatic climate control.

BACKGROUND OF THE INVENTION

Typically, automotive climate control heads have utilized an infrared sensor in combination with a thermistor or have utilized an aspirated thermistor by itself. FIG. 1A depicts a typical prior art automotive climate control head 100 with an integrated infrared sensor 102. Such control heads have typically included a number of switch pads 104 for controlling various functions of an automotive climate control system. Such systems have generally also included a display 115 for displaying cabin temperature associated with a driver of the vehicle, as well as, in many cases, an occupant of the vehicle. FIG. 1B depicts a portion of a typical printed circuit board (PCB) assembly 110 that has, in conjunction with the control head 100, allowed an occupant of the vehicle to provide input to the automotive climate control system. As is shown in FIG. 1B, the PCB assembly 110 includes a printed circuit board (PCB) 114 that includes a number of switch contacts that interface with collapsible switch domes 106 of a flexible switch pad 112. As is also shown in FIG. 1B, the display 115 and a sensor holder 116, which positions the infrared sensor 102 an appropriate distance from the PCB 114, are mounted to the PCB 114. With reference to FIG. 1C, the sensor holder 116 has been a molded plastic holder that receives a thermistor 120 and the IR sensor 102 and properly orients the thermistor 120 with respect to the infrared sensor 102. In such a prior art assembly, thermal grease has typically been required to transfer heat from a bottom of the infrared sensor 102 to the thermistor 120.

FIG. 2A depicts a front view of a typical prior art automotive control head 200 that includes an integrated aspirated sensor grill 202 and a plurality of switch pads 204, which provides various input to a climate control system of a motor vehicle. As is also shown in FIG. 2A, the automotive control head 200 includes a display 206, which may display the cabin temperature associated with a driver of the motor vehicle and may also display the cabin temperature associated with a passenger of the motor vehicle. FIG. 2B depicts a cross-sectional view of an aspirated sensor assembly 210, which is located behind the automotive climate control head 200. As is shown in FIG. 2B, the grill 202 is incorporated within a top surface of faceplate 222, which is typically formed in a cylindrical manner and extends from a printed circuit board (PCB) 214 toward an interior of the control head 200. The PCB 214 includes an aperture 224 across which a thermistor 220 is located. A case 226, which houses a fan 228, also includes a grill 230 incorporated at a bottom surface. The fan 228, when in operation, pulls air through the grill 202 and exhausts air out the grill 230. In this manner, cabin air is brought across the thermistor 220 to provide an indication of the current cabin temperature. In an effort to prevent temperature contamination of the thermistor 220 from other components located on the PCB 214, a circular seal 232 has been located between the faceplate 222 and the PCB 214 and a seal 234 has been located between the bottom of the PCB 214 and the case 226. It should be appreciated that sensor assemblies, such as the aspirated sensor assembly 210, as is illustrated in FIG. 2B, includes a number of components which must be individually manufactured and which also require assembly.

What is needed is a temperature sensor holder that can properly transfer heat between an infrared sensor and its associated thermistor that does not require thermal grease. Further, it would be desirable to provide an aspirated sensor for an automotive climate control head that does not require separate seals to block thermal contamination of an associated thermistor.

SUMMARY OF THE INVENTION

The present invention is directed to an automatic climate control for a motor vehicle that includes a printed circuit board (PCB), a flexible conductive switch pad and a temperature sensor. The flexible conductive switch pad includes a structure that is formed in conjunction with the flexible conductive switch pad. A switch dome of the flexible conductive switch pad is shaped to make electrical contact with switch contacts formed on the PCB responsive to activation of the switch dome. A portion of the structure includes a localized thermally conductive filler material that uses the conductive switch pad base material for an elastomeric binder and a temperature sensor is positioned within the structure and electrically coupled to sensor contacts on the PCB.

According to another embodiment of the present invention, the structure functions as a ductwork and the thermally conductive material provides temperature isolation for the temperature sensor positioned within the ductwork. According to yet another embodiment of the present invention, the temperature sensor includes an infrared sensor and a thermistor both electrically coupled to different ones of the sensor contacts of the PCB and the structure functions as a temperature sensor holder, which is affixed to the PCB. The temperature sensor holder includes a first recess for receiving the thermistor and a second recess for receiving the infrared sensor and a shape of the temperature sensor holder defines an orientation between the PCB and the temperature sensor. In this embodiment, a portion of the temperature sensor holder that is in contact with infrared sensor and the thermistor is constructed with the thermally conductive filler material within the elastomeric binder of the switchpad, such as silicone rubber, which facilities heat transfer from a base of the infrared sensor to the thermistor.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT(S)

According to one embodiment of the present invention, an automatic climate control for a motor vehicle includes a printed circuit board (PCB), a flexible conductive switch pad and a temperature sensor. The flexible conductive switch pad includes a structure that is formed in conjunction with the flexible conductive switch pad. A switch dome of the flexible conductive switch pad is shaped to make electrical contact with switch contacts formed on the PCB responsive to activation of the switch dome. A portion of the structure includes a thermally conductive material, e.g., an elastomer such as a localized thermally conductive filler material, that uses the conductive switch pad base material for an elastomeric binder and the temperature sensor is positioned within the structure and electrically coupled to sensor contacts on the PCB.

When implemented within an automotive climate control head that utilizes an infrared sensor, the structure acts as a temperature sensor holder and a portion of the temperature sensor holder that is in contact with the infrared sensor and the thermistor is constructed with the thermally conductive filler material within the elastomeric binder of the switchpad, such as silicone rubber, which facilities heat transfer from a base of the infrared sensor to the thermistor. When the present invention is implemented within an automotive climate control head that functions with an aspirated sensor, the structure functions as a ductwork and a thermally conductive material, e.g., an elastomer such as a silicone rubber with a localized thermally conductive filler material that uses the conductive switch pad base material for an elastomeric binder, provides temperature isolation for a thermistor positioned within the ductwork. In one embodiment, the thermistor is mounted across an aperture in the PCB. In another embodiment, the thermistor is surface mounted to the PCB, which includes apertures on the opposite sides of the surface mounted thermistor.

In another embodiment, the ductwork includes an integrally formed front portion with a front grating covering a front ductwork cavity, which is aligned with the aperture in the PCB. In this embodiment, a front surface area of the front portion of the ductwork includes the thermally conductive material, which is positioned opposite the front grating and functions to radiate heat originating from the PCB away from the thermistor. The ductwork may also include an integrally formed rear portion with a rear grating covering a rear ductwork cavity, which is aligned with the aperture in the PCB. In this embodiment, a rear interface area of the rear portion of the ductwork may include the thermally conductive material positioned opposite the rear grating, which also functions to radiate heat originating from the PCB away from the thermistor.

Figure 1A:
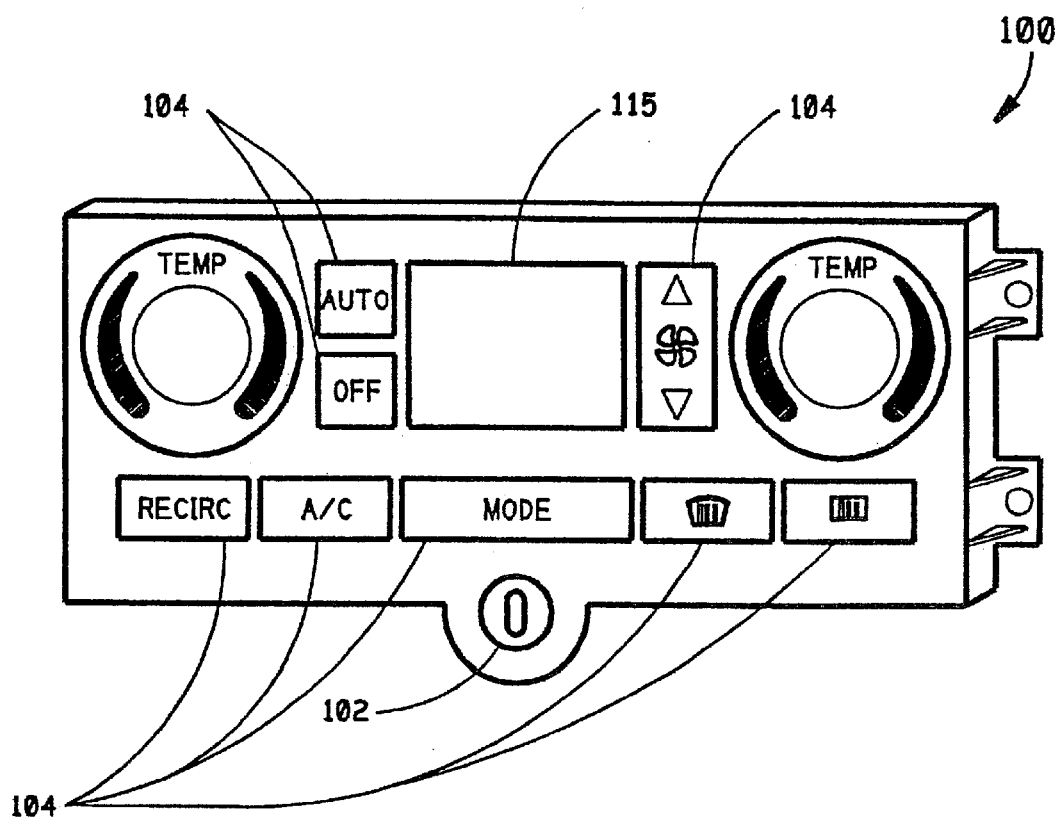
FIG. 1A is a front view of a typical automotive climate control head that utilizes an integrated infrared sensor, according to the prior art.
Figure 1B:
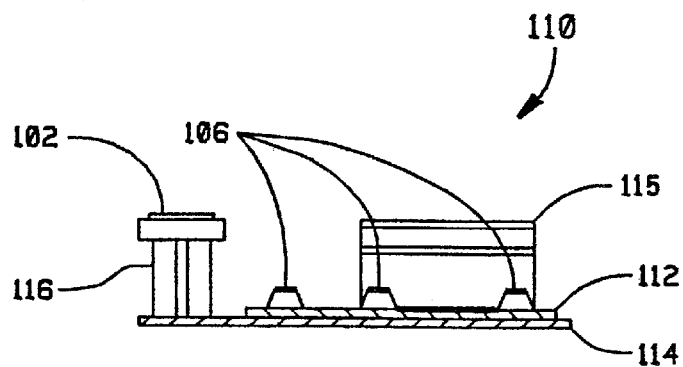
FIG. 1B is a partial cross-sectional view of a typical printed circuit board (PCB) assembly utilized in conjunction with the control head of FIG. 1A.
Figure 1C:
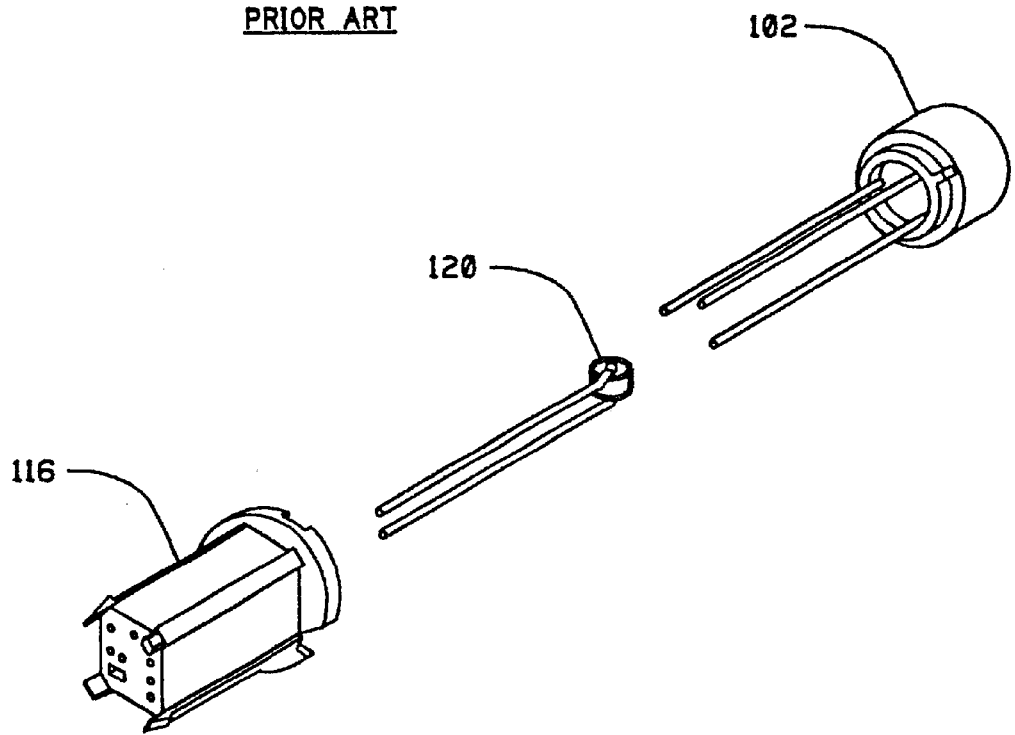
FIG. 1C is an exploded view of a typical prior art sensor holder and its associated sensors.
Figure 3:
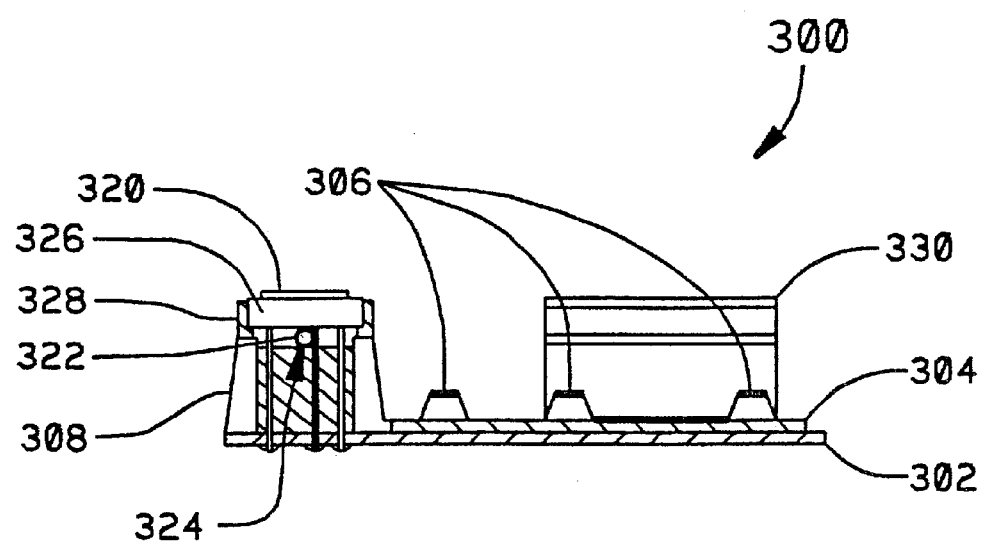
FIG. 3 is a partial cross-sectional view of a PCB assembly including an infrared sensor and a thermistor, according to an embodiment of the present invention.
Figure 2A:
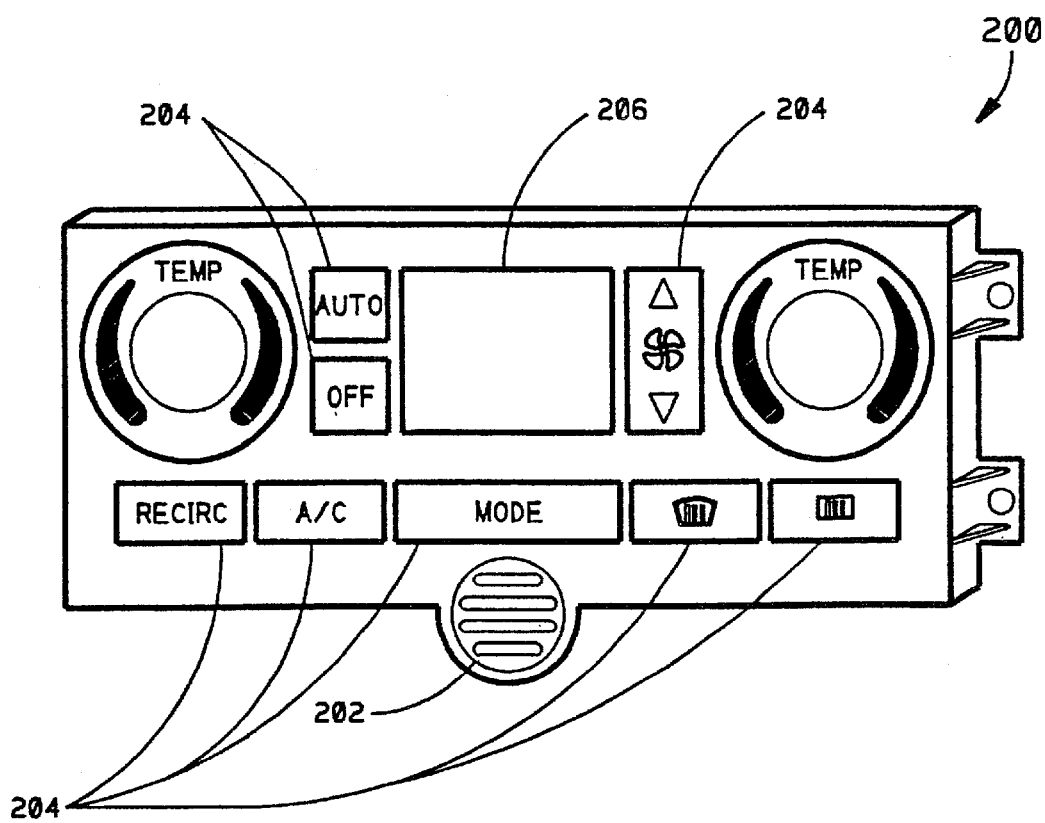
FIG. 2A is a front view of a typical automotive climate control head that includes an integrated aspirated sensor, according to the prior art.
Figure 2B:
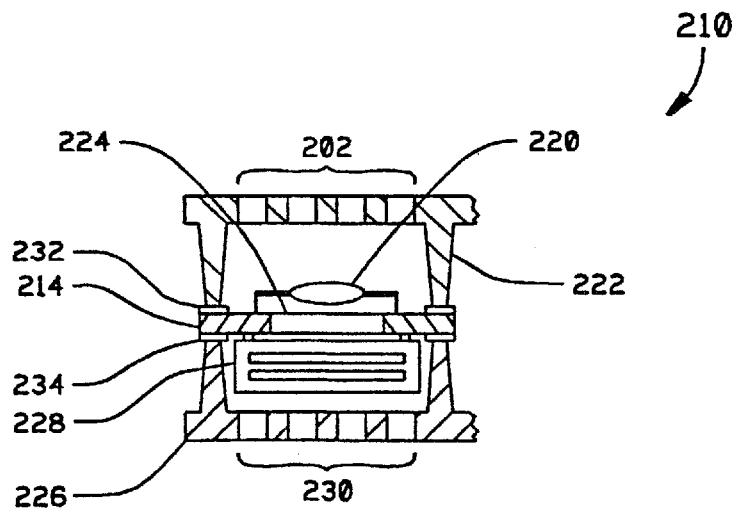
FIG. 2B is a partial cross-sectional view of a typical aspirated sensor assembly that has been utilized with the automotive climate control head of FIG. 2A.

FIG. 3 depicts a printed circuit board (PCB) assembly 300, constructed according to an embodiment of the present invention. The assembly 300 includes a PCB 302 and a switch pad 304. The switch pad 304 includes one or more switch domes 306 and a structure 308, which functions as a temperature sensor holder. A temperature sensor, including an infrared sensor 320 and a thermistor 322, is positioned within the temperature sensor holder and the infrared sensor 320 and the thermistor 322 are electrically coupled to sensor contacts of the PCB 302. It should be appreciated that the shape of the temperature sensor holder defines an orientation between the PCB and the temperature sensor. As is shown in FIG. 3, the structure 308 includes a first recess 324 for receiving the thermistor 322 and a second recess 326 for receiving the infrared sensor 320. A portion 328 of the temperature sensor holder 308 that is contact with the infrared sensor 320 and the thermistor 322 is made of a thermally conductive material, which facilitates heat transfer from a base of the infrared sensor 320 to the thermistor 322.

It should be appreciated that the structure 308 can be made of varying hardnesses during formation of the switch pad 304. That is, switch domes 306 can be made to be collapsible while the structure 308 can be made relatively rigid to properly maintain the relationship of the infrared sensor 320 and thermistor 322 to each other and to the PCB 302. Further, the portion 328 can be made of a resilient material to facilitate better contact with the infrared sensor 320 and the thermistor 322 and, thus, facilitate better heat transfer between the components. The printed circuit board assembly 300 may also include a display 330 mounted to the PCB 302.

Figure 4A:
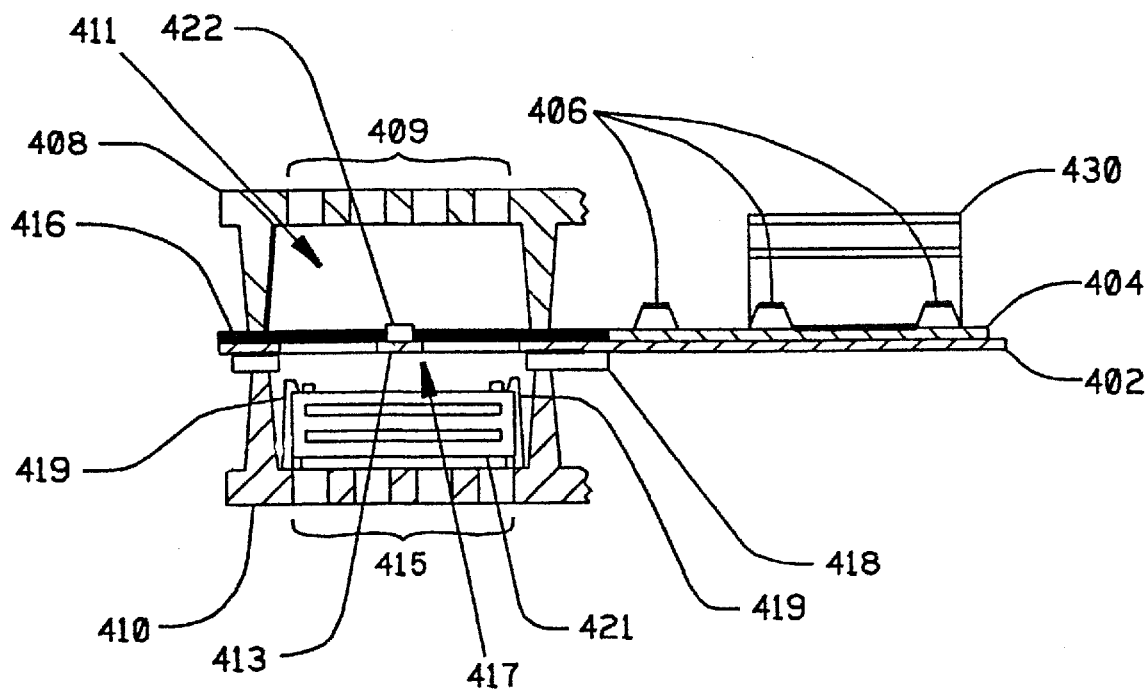
FIG. 4A is a partial cross-sectional view of a PCB assembly for an aspirated sensor, according to another embodiment of the present invention.
Figure 4B:
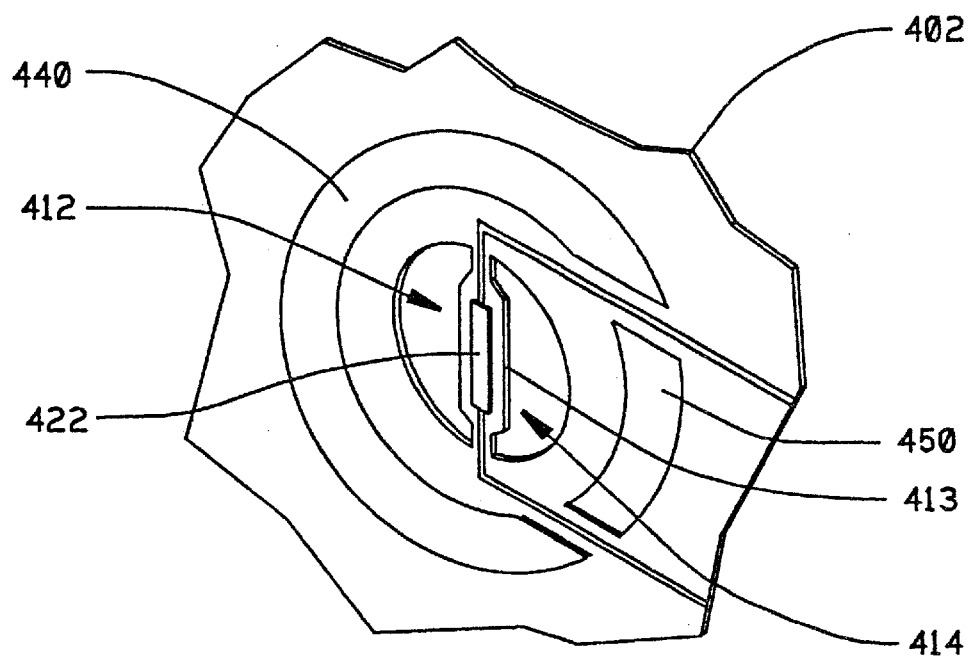
FIGS. 4B–4C depict a portion of a PCB for use with an aspirated sensor in the area where the thermistor is mounted to the board according to different embodiments of the present invention.

FIG. 4A depicts a crosssectional view of an aspirated sensor constructed according to one embodiment of the present invention. According to the present invention, a switch pad 404 may include one or more collapsible switch domes 406 and an integrated structure that acts as a ductwork for the sensor 422. As is shown in FIG. 4B, the PCB 402 includes apertures 412 and 414 formed on either side of a mounting section 413 of the PCB 402, which receives a surface thermistor 422. A front portion 408 of the integrated structure includes an integrally formed front grating 409 covering a front ductwork cavity 411, which is aligned with the apertures 412 and 414 formed in the PCB 402. As is shown in the cross-section of FIG. 4A, the temperature sensor is a surface mounted thermistor 422, which is mounted to a section 413 of the PCB 402. A front interface area 416 of the front portion 408 of the structure includes a thermally conductive material, e.g. an elastomer such as silicone rubber with a localized thermally conductive filler material that uses the conductive switch pad base material for an elastomeric binder, positioned opposite the front grating 409 for radiating heat originating from the PCB 402 away from the thermistor 422.

Similarly, a rear interface area 418 of a rear portion 410 of the structure includes a thermally conductive material, e.g. an elastomer such as silicone rubber with a localized thermally conductive filler material that uses the conductive switch pad base material for an elastomeric binder positioned opposite a rear grating 415, which also acts to radiate heat originating from the PCB 402 away from the thermistor 422. Thus, the thermally conductive material implemented in the rear interface area 418 and the front interface area 416 obviates the need for a separate seal to provide a thermal barrier for the thermistor 422. Advantageously, the front portion 408 and the rear portion 410 of the structure can be integrally formed with the switch domes 406 of the switch pad 404. Further, front and rear portions 408 and 410 of the structure can be formed with a different hardness than that of the collapsible switch domes 406 and, thus, allow apparatuses, such as a fan 421, to be retained within a rear ductwork cavity 417, which includes retaining arms 419 to retain the fan 421.

Figure 4C:
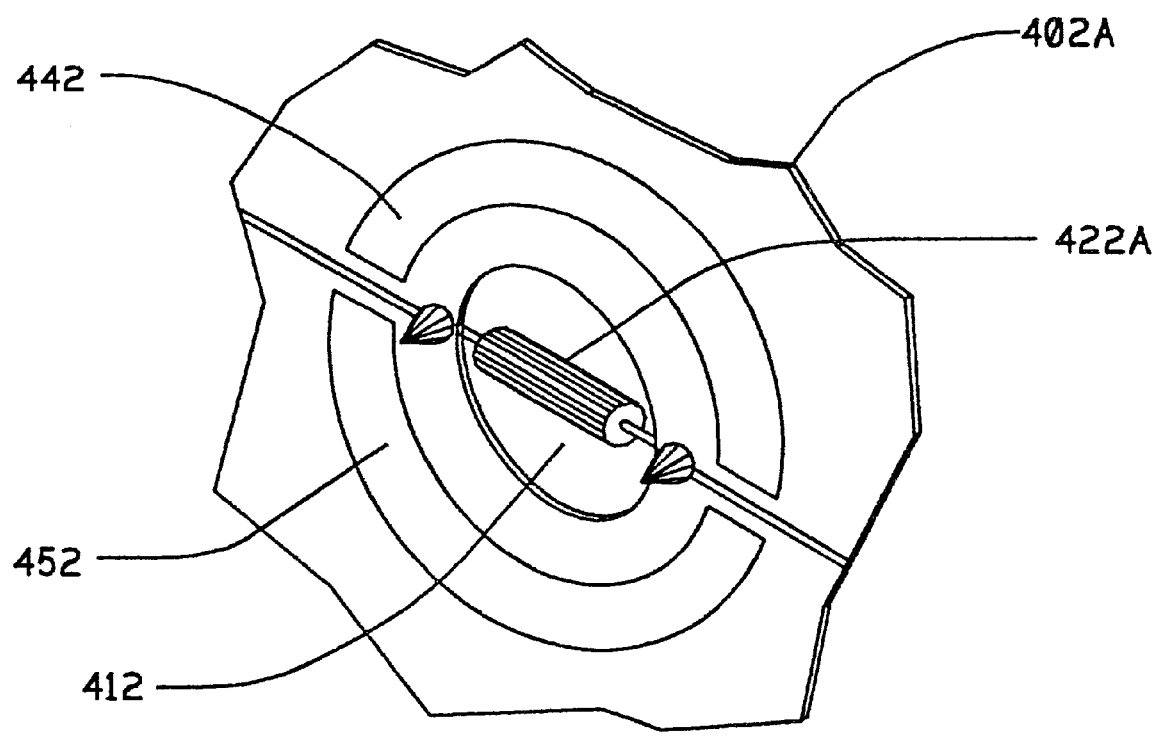

FIG. 4B provides further detail of the mounting of the surface mount thermistor 422 to the center portion 413 of the PCB 402 and specifically depicts the apertures 412 and 414. As is shown in FIG. 4B, the PCB 402 may include semi-circular rings 440 and 450 formed of a conductive material on the surface of the PCB 402, which function to provide an interface to the thermally conductive material of the front portion 408 of the structure. Likewise, similar type circular rings or pads may be formed on a rear surface of the PCB 404. FIG. 4C depicts a PCB 402A that utilizes a thermistor 422A with leads soldered across an aperture 412 formed in the PCB 402A. Similar to the embodiment of FIG. 4B, semi-circular rings or pads 442 and 452 may be provided on either side of the PCB 402A to provide an interface to the areas 416 and 418 of the front portion 408 and the rear portion 410, respectively, of the integrated structure.

Accordingly, an automatic climate control for a motor vehicle has been described herein that includes a flexible conductive switch pad that includes an integrated temperature sensor holder that is formed in conjunction with the flexible conductive switch pad. The temperature sensor may include an infrared sensor and a thermistor and in this embodiment the temperature sensor holder includes a first recess for receiving the thermistor and a second recess for receiving the infrared sensor. Further, the portion of the temperature sensor holder that is in contact with infrared sensor and the thermistor is made of a thermally conductive material, which facilities heat transfer from a base of the infrared sensor to the thermistor. As is also described herein, an automatic climate control for a motor vehicle may include a flexible conductive switch pad that includes an integrated ductwork that is formed in conjunction with the flexible conductive switch pad. The ductwork includes a thermally conductive material that provides thermal temperature isolation for a temperature sensor located within the ductwork.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An automatic climate control for a motor vehicle, comprising:
    a printed circuit board (PCB);
    a flexible conductive switch pad including an integrated temperature sensor holder that is formed in conjunction with the flexible conductive switch pad, wherein a switch dome of the flexible conductive switch pad is shaped to make electrical contact with switch contacts formed on the PCB responsive to activation of the switch dome; and
    a temperature sensor positioned within the temperature sensor holder and electrically coupled to sensor contacts of the PCB, wherein a shape of the sensor holder defines an orientation between the PCB and the temperature sensor.

2. The control of claim 1, wherein the temperature sensor includes an infrared sensor and a thermistor, and wherein the temperature sensor holder includes a first recess for receiving the thermistor and a second recess for receiving the infrared sensor.

3. The control of claim 2, wherein a portion of the temperature sensor holder that is in contact with the infrared sensor and the thermistor is made of a thermally conductive rubber, wherein the thermally conductive rubber facilitates heat transfer from a base of the infrared sensor to the thermistor.

4. An automatic climate control for a motor vehicle, comprising:
    a printed circuit board (PCB);
    a flexible conductive switch pad, wherein a switch dome of the flexible conductive switch pad is shaped to make electrical contact with switch contacts formed on the PCB responsive to activation of the switch dome;
    a temperature sensor including an infrared sensor and a thermistor both electrically coupled to different sensor contacts of the PCB; and
    a temperature sensor holder affixed to the PCB, wherein the temperature sensor holder includes a first recess for receiving the thermistor and a second recess for receiving the infrared sensor, and wherein a shape of the sensor holder defines an orientation between the PCB and the temperature sensor, where a portion of the temperature sensor holder that is in contact with the infrared sensor and the thermistor is made of a thermally conductive material that facilitates heat transfer from a base of the infrared sensor to the thermistor.

5. The control of claim 4, wherein the temperature sensor holder is formed in conjunction with the flexible conductive switch pad as an integrated unit.

6. An automatic climate control for a motor vehicle, comprising:
    a printed circuit board (PCB);
    a flexible conductive switch pad including an integrated ductwork that is formed in conjunction with the flexible conductive switch pad, wherein a switch dome of the flexible conductive switch pad is shaped to make electrical contact with switch contacts formed on the PCB responsive to activation of the switch dome, and wherein a portion of the ductwork includes a thermally conductive elastomer; and
    a temperature sensor positioned within the ductwork and electrically coupled to sensor contacts on the PCB, wherein the thermally conductive elastomer provides temperature isolation for the temperature sensor.

7. The control of claim 6, wherein the temperature sensor is a thermistor.

8. The control of claim 6, wherein the temperature sensor is a thermistor and the PCB includes an aperture, and wherein the thermistor is mounted across the aperture in the PCB.

9. The control of claim 6, wherein the temperature sensor is a surface mounted thermistor, and wherein the thermistor is mounted to the PCB, which includes apertures on opposite sides of the thermistor.

10. The control of claim 6, wherein the ductwork includes an integrally formed front portion with a front grating covering a front ductwork cavity which is aligned with an aperture in the PCB, and wherein the temperature sensor includes a thermistor mounted across the aperture in the PCB.

11. The control of claim 10, wherein the ductwork includes an integrally formed rear portion with a rear grating covering a rear ductwork cavity which is aligned with the aperture in the PCB.

12. The control of claim 11, wherein a rear interface area of the rear portion of the ductwork includes the thermally conductive elastomer positioned opposite the rear grating for radiating heat originating from the PCB away from the thermistor.

13. The control of claim 12, wherein the PCB includes a rear conductive area which acts as a heat sink, and wherein the rear conductive area is in thermal contact with the rear interface area of the rear portion of the ductwork.

14. The control of claim 10, wherein a front interface area of the front portion of the ductwork includes the thermally conductive elastomer positioned opposite the front grating for radiating heat originating from the PCB away from the thermistor.

15. The control of claim 14, wherein the PCB includes a front conductive area which acts as a heat sink, and wherein the front conductive area is in thermal contact with the front interface area of the front portion of the ductwork.

16. An automatic climate control for a motor vehicle, comprising:
  a printed circuit board (PCB);
  a flexible conductive switch pad including a structure that is formed in conjunction with the flexible conductive switch pad, wherein a switch dome of the flexible conductive switch pad is shaped to make electrical contact with switch contacts formed on the PCB responsive to activation of the switch dome, and wherein a portion of the structure includes a thermally conductive material; and
  a temperature sensor positioned within the structure and electrically coupled to sensor contacts on the PCB.

17. The control of claim 16, wherein the structure is a ductwork and the thermally conductive material is an elastomer that provides temperature isolation for the temperature sensor positioned within the ductwork.

18. The control of claim 17, wherein the temperature sensor is a thermistor.

19. The control of claim 17, wherein the temperature sensor is a thermistor and the PCB includes an aperture, and wherein the thermistor is mounted across the aperture in the PCB.

20. The control of claim 17, wherein the temperature sensor is a surface mounted thermistor, and wherein the thermistor is mounted to the PCB, which includes apertures on opposite sides of the surface, mounted thermistor.

21. The control of claim 17, wherein the ductwork includes an integrally formed front portion with a front grating covering a front ductwork cavity which is aligned with an aperture in the PCB, and wherein the temperature sensor includes a thermistor mounted across the aperture in the PCB.

22. The control of claim 21, wherein the ductwork includes an integrally formed rear portion with a rear grating covering a rear ductwork cavity which is aligned with the aperture in the PCB.

23. The control of claim 22, wherein a rear interface area of the rear portion of the ductwork includes the elastomer positioned opposite the rear grating for radiating heat originating from the PCB away from the thermistor.

24. The control of claim 23, wherein the PCB includes a rear conductive area which acts as a heat sink, and wherein the rear conductive area is in thermal contact with the rear interface area of the rear portion of the ductwork.

25. The control of claim 21, wherein a front interface area of the front portion of the ductwork includes the elastomer positioned opposite the front grating for radiating heat originating from the PCB away from the thermistor.

26. The control of claim 25, wherein the PCB includes a front conductive area which acts as a heat sink, and wherein the front conductive area is in thermal contact with the front interface area of the front portion of the ductwork.

27. The control of claim 16, wherein the structure is a temperature sensor holder, and wherein a shape of the sensor holder defines an orientation between the PCB and the temperature sensor.

28. The control of claim 27, wherein the temperature sensor includes an infrared sensor and a thermistor, and wherein the temperature sensor holder includes a first recess for receiving the thermistor and a second recess for receiving the infrared sensor.

29. The control of claim 28, wherein a portion of the temperature sensor holder that is in contact with the infrared sensor and the thermistor is made of the thermally conductive material, and wherein the thermally conductive material is a rubber that facilitates heat transfer from a base of the infrared sensor to the thermistor.

30. The control of claim 16, wherein the temperature sensor includes an infrared sensor and a thermistor both electrically coupled to different ones of the sensor contacts of the PCB and the structure is a temperature sensor holder which is affixed to the PCB, and wherein the temperature sensor holder includes a first recess for receiving the thermistor and a second recess for receiving the infrared sensor and a shape of the temperature sensor holder defines an orientation between the PCB and the temperature sensor, where a portion of the temperature sensor holder that is in contact with the infrared sensor and the thermistor is made of the thermally conductive material which facilitates heat transfer from a base of the infrared sensor to the thermistor.

31. The control of claim 30, wherein the temperature sensor holder is formed in conjunction with the flexible conductive switch pad as an integrated unit.

* * * * *